(12) United States Patent
Yang et al.

(10) Patent No.: US 11,102,404 B2
(45) Date of Patent: Aug. 24, 2021

(54) CAMERA MODULE AND TERMINAL

(71) Applicant: BEIJING XIAOMI MOBILE SOFTWARE CO., LTD., Beijing (CN)

(72) Inventors: Jieming Yang, Beijing (CN); Gaocai Han, Beijing (CN); Hongzhi Jin, Beijing (CN); Tao Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 53 days.

(21) Appl. No.: 16/665,242

(22) Filed: Oct. 28, 2019

(65) Prior Publication Data

US 2020/0244878 A1  Jul. 30, 2020

(30) Foreign Application Priority Data

Jan. 28, 2019 (CN) .......................... 201910081698.7

(51) Int. Cl.
*H04N 5/225* (2006.01)
*H04N 5/232* (2006.01)
*H04M 1/02* (2006.01)
*H04N 5/247* (2006.01)

(52) U.S. Cl.
CPC ...... *H04N 5/23238* (2013.01); *H04M 1/0264* (2013.01); *H04N 5/247* (2013.01)

(58) Field of Classification Search
CPC .............. H04N 5/2258; H04N 5/2259; H04N 5/23299; H04M 1/0264
USPC ........................................................ 348/373
See application file for complete search history.

(56) References Cited

U.S. PATENT DOCUMENTS

| | | | | |
|---|---|---|---|---|
| 9,686,468 | B2* | 6/2017 | Eromaki | H04N 5/23238 |
| 10,616,563 | B2* | 4/2020 | Taylor | H04N 5/247 |
| 2011/0128393 | A1* | 6/2011 | Tavi | H04N 5/2257 348/218.1 |
| 2016/0248949 | A1* | 8/2016 | Godler | H04N 5/23287 |
| 2018/0115720 | A1* | 4/2018 | Jones | H04N 5/2258 |
| 2019/0356862 | A1* | 11/2019 | Lu | H04N 5/23299 |
| 2020/0186710 | A1* | 6/2020 | Sheikh | H04N 5/3415 |

FOREIGN PATENT DOCUMENTS

KR   20100001924 A   1/2010

OTHER PUBLICATIONS

OA for EP application 19212666.2, mailed on Jun. 29, 2020.

* cited by examiner

*Primary Examiner* — Anthony J Daniels
(74) *Attorney, Agent, or Firm* — Syncoda LLC; Feng Ma

(57) ABSTRACT

A camera module includes a first camera, a second camera, and a driving component. The first camera and the second camera are symmetrically arranged in the camera module, connected by a shaft, and configured to photograph a non-wide-angle image; the first camera is provided with a first translation shaft, and the second camera is provided with a second translation shaft; the driving component is connected with the first translation shaft and the second translation shaft to drive the first translation shaft and the second translation shaft to move in opposite directions and drive the first camera and the second camera to rotate synchronously in two opposite directions about the shaft.

19 Claims, 8 Drawing Sheets

CAMERA MODULE AND TERMINAL

CROSS-REFERENCE TO RELATED APPLICATION

This application claims priority to Chinese Patent Application Serial No. 201910081698.7 filed on Jan. 28, 2019, the disclosure of which is hereby incorporated by reference in its entirety.

BACKGROUND

With users' increasing attention to photographing function of a smartphone, a camera has become one of the important hardware configurations of the smartphone, and mobile phone manufacturers enrich and strengthen the photographing function of the smartphone in an important direction of research.

SUMMARY

The present disclosure relates generally to a technical field of terminals, and more specifically to a camera module and a terminal.

Various embodiments of the disclosure provide a camera module and a terminal to solve problems in the related art, the technical schemes are as follows.

According to a first aspect of embodiments of the present disclosure, there is provided a camera module, including a first camera provided with a first translation shaft; a second camera provided with a second translation shaft and connected with the first camera by a shaft, the first camera and the second camera being symmetrical about the shaft and configured to photograph a non-wide-angle image; and a driving component connected with the first translation shaft and the second translation shaft to drive the first translation shaft and the second translation shaft to move in opposite directions and drive the first camera and the second camera to rotate synchronously in two opposite directions about the shaft.

According to a second aspect of embodiments of the present disclosure, there is provided another camera module, including a first camera provided with a first translation shaft; a second camera provided with a second translation shaft and connected with the first camera by a shaft, the first camera and the second camera being symmetrical about the shaft and configured to photograph a non-wide-angle image; and a driving component connected with the first translation shaft and the second translation shaft to drive the first camera and the second camera to move towards each other or away from each other and drive the first camera and the second camera to rotate synchronously about the shaft towards each other or away from each other.

According to a third aspect of embodiments of the present disclosure, there is provided a terminal, including a processor, a battery cover, and a camera module. The camera module includes a first camera; a second camera connected with the first camera by a shaft, the first camera and the second camera being symmetrical about the shaft and configured to photograph a non-wide-angle image; and a driving component connected with the first camera and the second camera to drive the first camera and the second camera to rotate about the shaft and obliquely protrude from the battery cover. The processor is connected with the camera module and configured to instruct the driving component of the camera module to drive the first camera and the second camera to rotate synchronously about the shaft of the camera module in two opposite directions, and to instruct the first camera and the second camera to photograph at least two non-wide-angle images in different ranges of viewing angles during rotation, and to synthesize the non-wide-angle images into a wide-angle image.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate embodiments consistent with the disclosure and, together with the description, serve to explain the principles of some embodiments of the disclosure.

DETAILED DESCRIPTION

Figure 1:
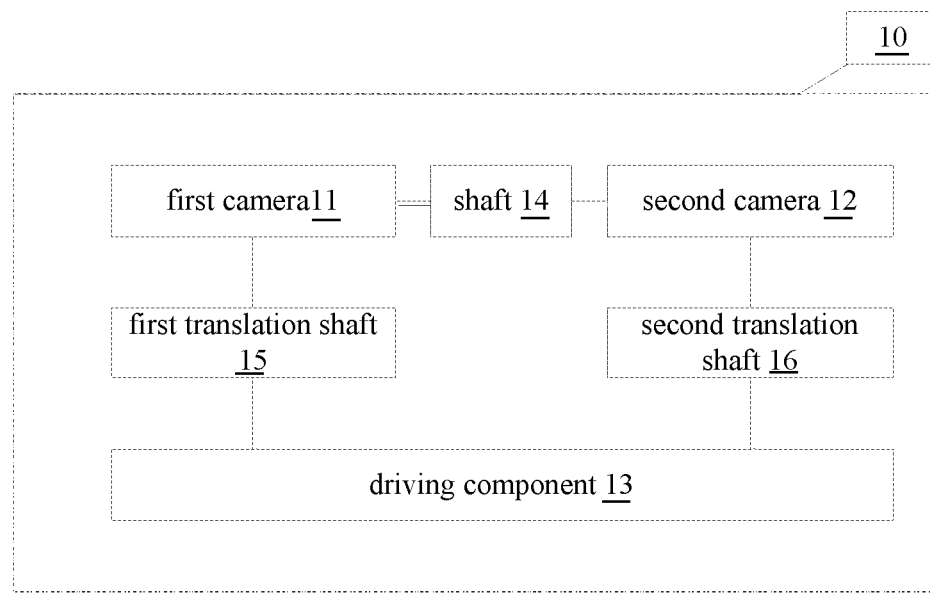
FIG. 1 is a block diagram of a camera module according to some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

A smartphone can be used for photographing an object much clearly and beautify a picture by increasing the number of camera numbers on the smartphone, to meet the users' photographing needs. However, restricted by lens, the current smartphone can only capture within a limited viewing angle, which is not good at photographing large-scale images. While distortion is generated during imaging by wide-angle lens, resulting in discrepancy between a picture and the actual objective and poor image quality.

In order to solve the technical problems that high quality and wide viewing angle images cannot be achieved in the related art, embodiments of the present disclosure provides a camera module, including: a first camera provided with a first translation shaft; a second camera provided with a second translation shaft and connected with the first camera by a shaft, the first camera and the second camera being symmetrical about the shaft and configured to photograph a non-wide-angle image; and a driving component connected with the first translation shaft and the second translation shaft to drive the first translation shaft and the second translation shaft to move in opposite directions and drive the first camera and the second camera to rotate synchronously in two opposite directions about the shaft. In embodiments of the present disclosure, the range of the viewing angle of each of the cameras is changed by driving the two cameras to rotate synchronously, thereby expanding the range of the effective viewing angle of the camera module. The camera module can automatically photograph high-quality and wide-angle images without a wide-angle lens, and the image quality is improved. The camera module meets users' photographing needs and improves users' experience.

Embodiments of the present disclosure provide a camera module, including a first camera provided with a first translation shaft; a second camera provided with a second translation shaft and connected with the first camera by a shaft, the first camera and the second camera being symmetrical about the shaft and configured to photograph a non-wide-angle image; and a driving component connected with the first translation shaft and the second translation shaft to drive the first camera and the second camera to move towards each other or away from each other and drive the first camera and the second camera to rotate synchronously about the shaft towards each other or away from each other.

Embodiments of the present disclosure provide a terminal, including a processor, a battery cover, and a camera module. The camera module includes a first camera; a second camera connected with the first camera by a shaft, the first camera and the second camera being symmetrical about the shaft and configured to photograph a non-wide-angle image; and a driving component connected with the first camera and the second camera to drive the first camera and the second camera to rotate about the shaft and obliquely protrude from the battery cover. The processor is connected with the camera module and configured to instruct the driving component of the camera module to drive the first camera and the second camera to rotate synchronously about the shaft of the camera module in two opposite directions, and to instruct the first camera and the second camera to photograph at least two non-wide-angle images in different ranges of viewing angles during rotation, and to synthesize the non-wide-angle images into a wide-angle image.

It should be noted that, a terminal may include a smartphone, photo camera, video camera, security camera, tablet computer, portable laptop, or wearable device and the like equipped with a camera.

FIG. 1 is a block diagram of a camera module according to some embodiments. As illustrated in FIG. 1, the camera module 10 includes a first camera 11, a second camera 12, and a driving component 13.

The various device components, units, blocks, or portions may have modular configurations, or are composed of discrete components, but nonetheless can be referred to as "modules" in general. In other words, the "components," "portions," "modules" or "units" referred to herein may or may not be in modular forms.

The first camera 11 and the second camera 12 are symmetrically arranged in the camera module 10, connected by a shaft 14, and configured to photograph a non-wide-angle image.

The first camera 11 is provided with a first translation shaft 15, and the second camera 12 is provided with a second translation shaft 16.

The driving component 13 is connected with the first translation shaft 15 and the second translation shaft 16 for driving the first translation shaft 15 and the second translation shaft 16 to move in opposite directions and driving the first camera 11 and the second camera 12 to rotate synchronously in two opposite directions about the shaft 14.

Exemplarily, the first translation shaft 15 and the second translation shaft 16 move synchronously in opposite directions.

Exemplarily, the first camera 11 and the second camera 12 are both provided with a non-wide-angle lens, and a single camera only can capture an image within a limited range of a viewing angle. The first camera 11 and the second camera 12 cooperate with the shaft 14 to form a hinged structure. Driven by the driving component 13, the first camera 11 and the second camera 12 can rotate in two opposite directions. When the first camera 11 and the second camera 12 rotate synchronously about the shaft 14 in the two opposite directions, respective ranges of viewing angles of the two cameras are changed. The ranges of viewing angle ranges of the two cameras only partially overlap at this time, such that the two cameras can take non-wide-angle images in different ranges of viewing angles, expanding a range of a viewing angle of the camera module. Then, a wide-angle image can be obtained by splicing and synthesizing the non-wide-angle images in different ranges of viewing angles.

According to the technical scheme provided by an embodiment of the present disclosure, the range of the viewing angle of each of the cameras is changed by controlling the two cameras of the camera module to rotate synchronously, thereby expanding the range of an effective viewing angle of the camera module. The camera module can automatically photograph high-quality and wide-angle images without a wide-angle lens, and the image quality is improved. The camera module meets users' photographing needs and improves users' experience.

Figure 2:
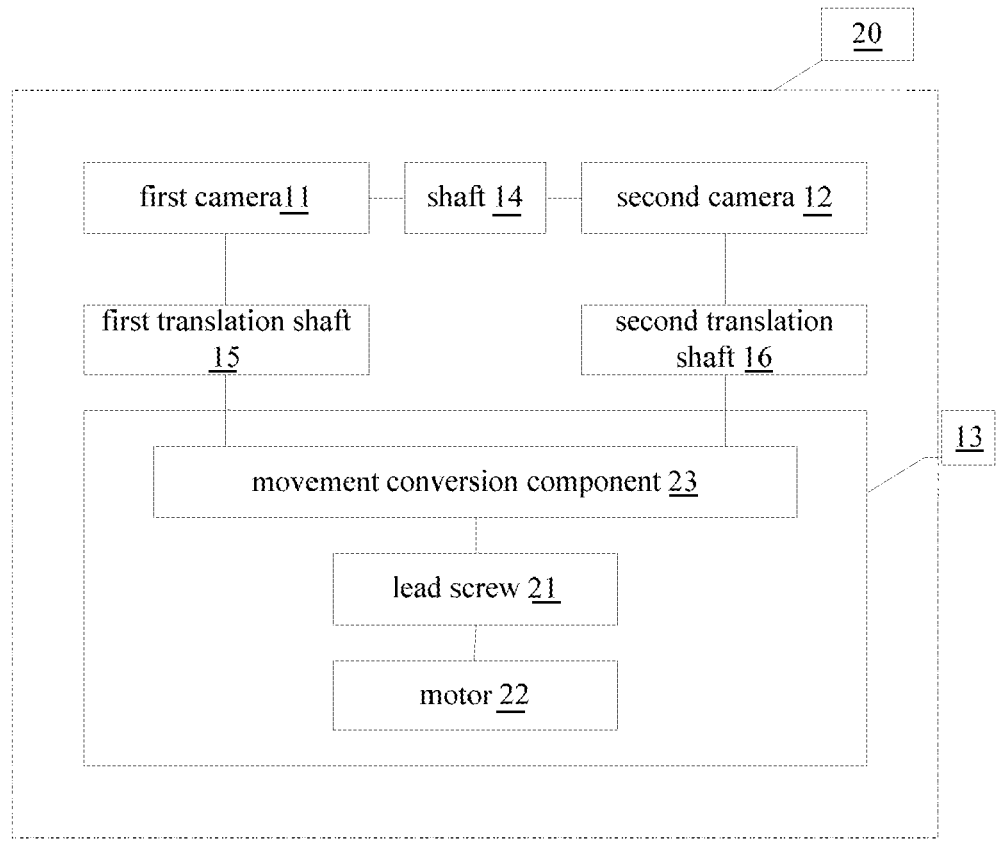
FIG. 2 is a block diagram of a camera module according to some embodiments.

FIG. 2 is a block diagram of a camera module according to some embodiments. Based on the embodiment illustrated in FIG. 1, the camera module 20 illustrated in FIG. 2 also includes a first camera 11, a second camera 12, a shaft 14, a first translation shaft 15, and a second translation shaft 16. Furthermore, a driving component of the camera module 20 illustrated in FIG. 2 include a lead screw 21, an electric motor 22 connected with the lead screw 21, and a movement conversion component 23. The electric motor 22 is configured to drive the lead screw 21 to rotate. For example, the electric motor may include a rotor motor or a linear motor.

The movement conversion component 23 is screwed on the lead screw 21 and connected with the first translation shaft 15 and the second translation shaft 16. The movement conversion component 23 is configured to convert rotational movement of the lead screw 21 into linear movement, so as to drive the first translation shaft 15 and the second translation shaft 16 to move in opposite directions, thereby further driving the first camera 11 and the second camera 12 to rotate synchronously about the shaft 14 in two opposite directions, such that the range of the viewing angle of each of the cameras is changed and the range of the effective viewing angle of the camera module is expanded.

In an embodiment, the above driving component may also include a reducer, and the reducer is connected with the electric motor and the lead screw to reduce a rotational speed output by the electric motor and drive the lead screw to rotate. In the present embodiment, considering that the stoke of the cameras is usually short, and a high position accuracy can be ensured during movement of the cameras by the reducer, such as a reduction gear box driving the lead screw to rotate, and the photographing quality can be ensured.

In an embodiment, the above camera module may also include a protective housing for arranging various parts of the camera module and sealing a corresponding assembling clearance of the camera module. The first camera and the second camera are arranged in the protective housing. For example, the protective housing may be used to support various parts of the camera module and seal the assembling clearance. The protective housing may also be a decorative piece related to the camera module. The shape of the protective housing may be determined according to the design requirement such as the shape of the camera module.

Figure 3:
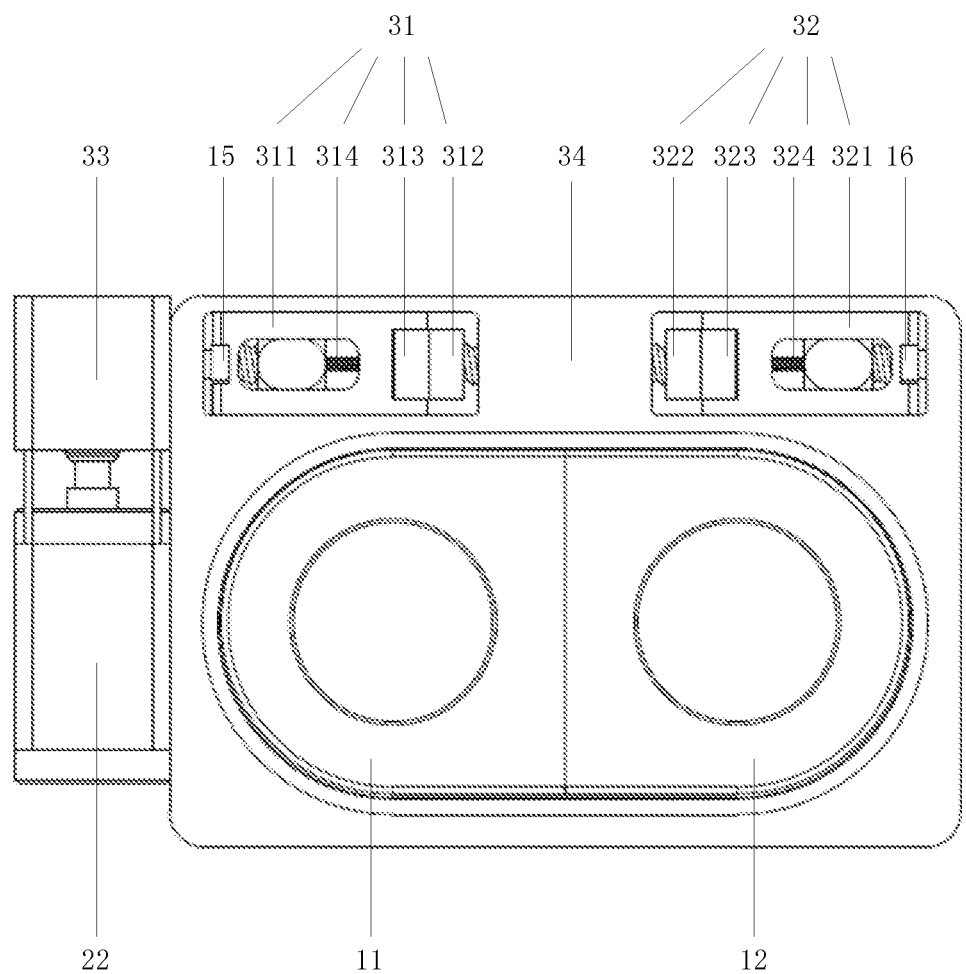
FIG. 3 is a front view of a camera module according to some embodiments before expansion of a viewing angle.
Figure 4:
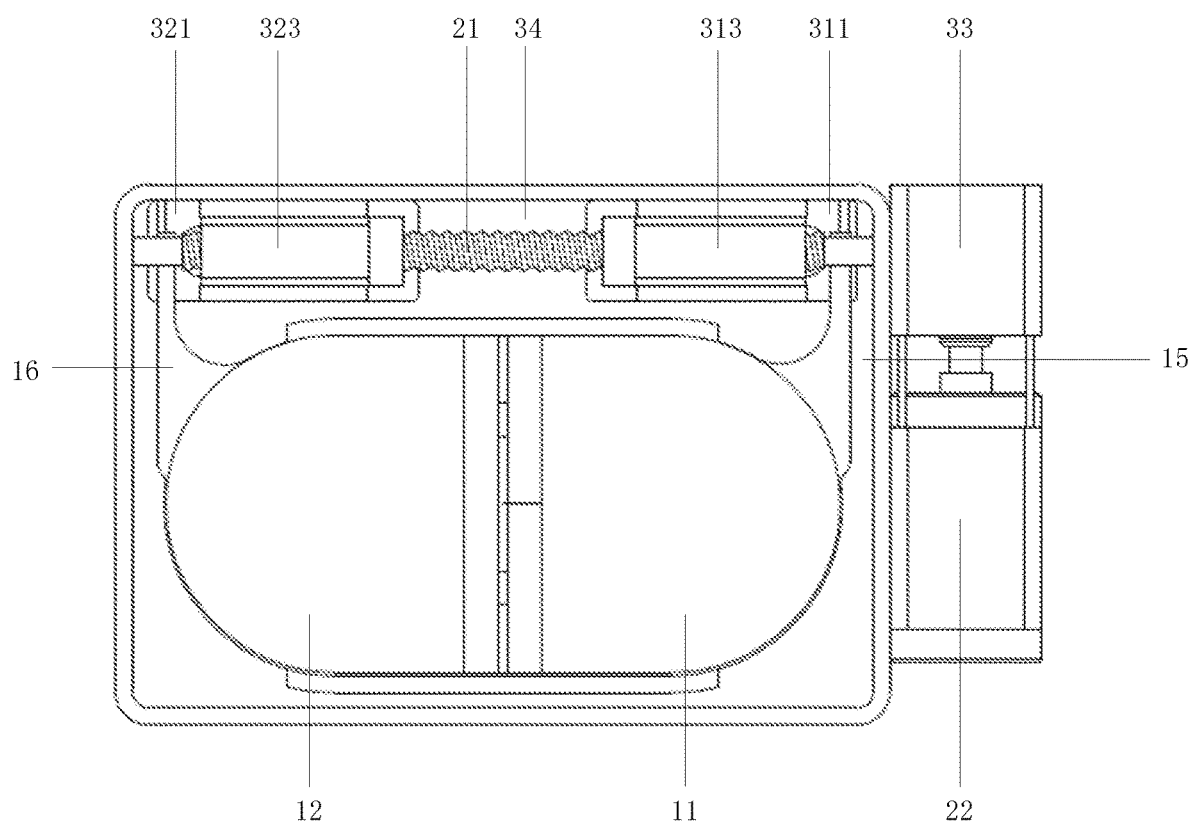
FIG. 4 is a rear view of a camera module according to some embodiments before expansion of a viewing angle.
Figure 5:
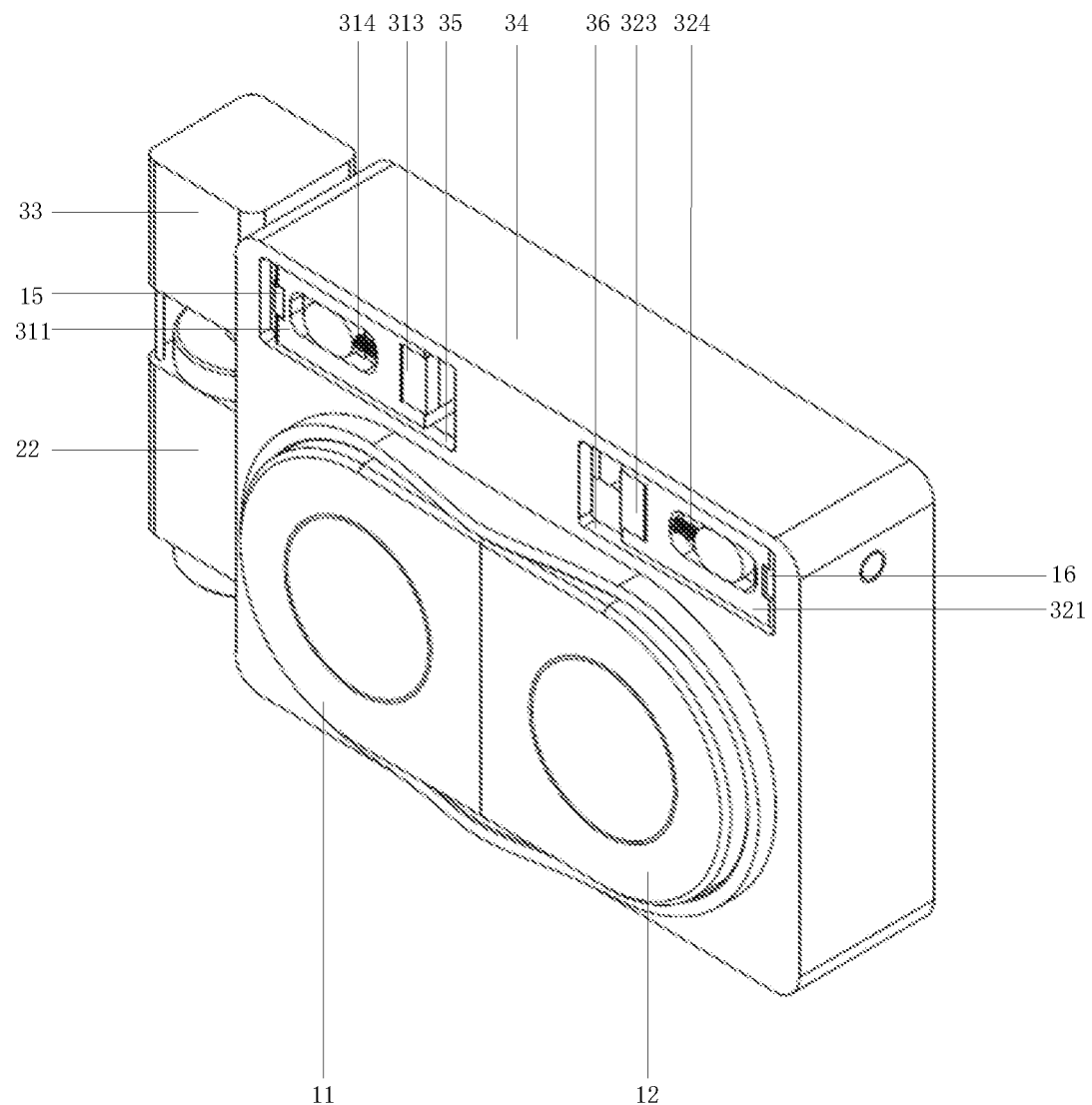
FIG. 5 is a side view of a camera module according to some embodiments before expansion of a viewing angle.
Figure 6:
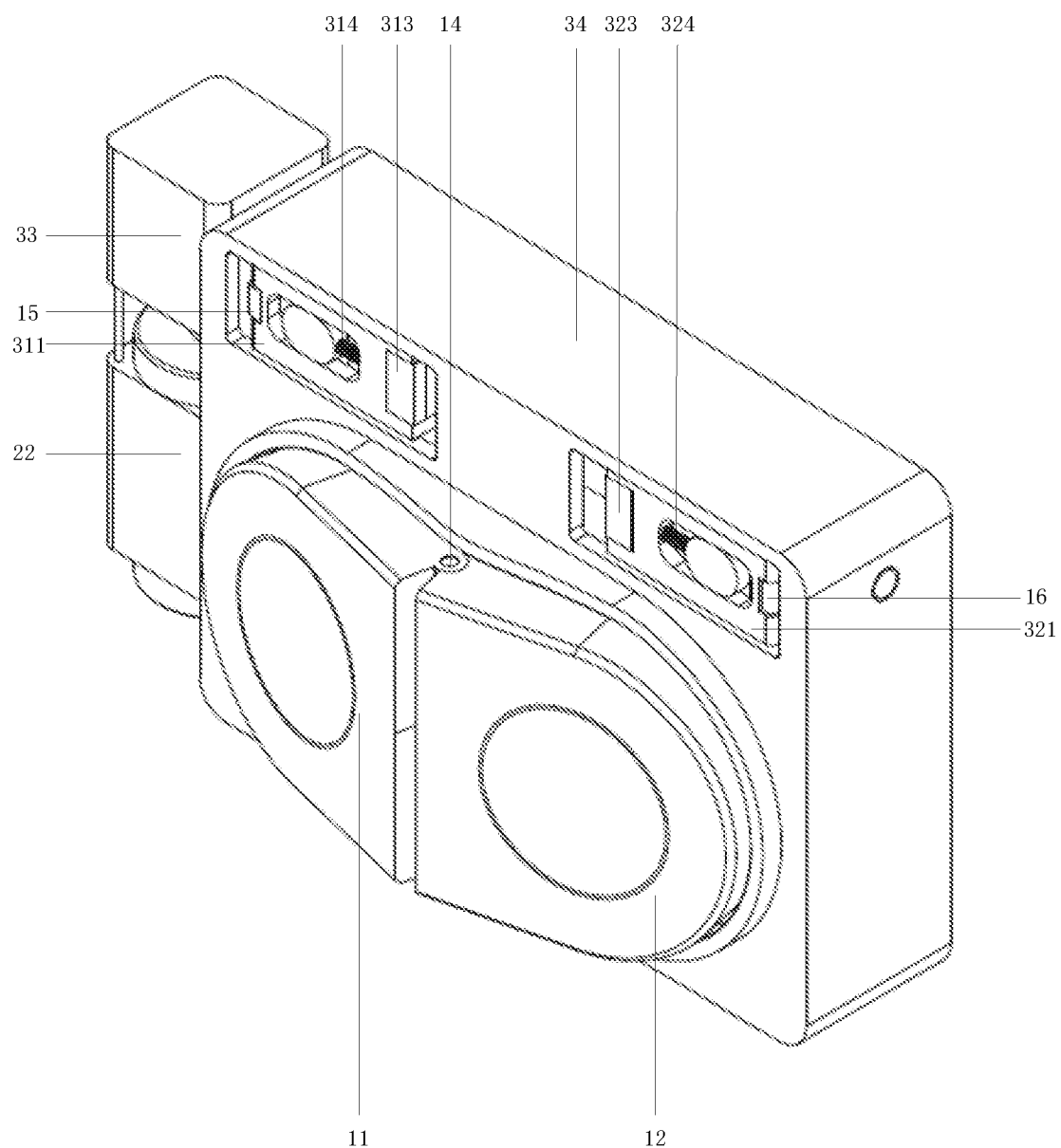
FIG. 6 is a camera module according to some embodiments after expansion of a viewing angle.

FIG. 3 is a front view of a camera module according to some embodiments before expansion of a viewing angle. FIG. 4 is a rear view of a camera module according to some embodiments before expansion of a viewing angle. FIG. 5 is a side view of a camera module according to some embodiments before expansion of a viewing angle. FIG. 6 is a camera module according to some embodiments after expansion of a viewing angle. On the basis of the above embodiments, the camera module illustrated in FIGS. 3 to 6 also includes a first camera 11, a second camera 12, a shaft 14, a first translation shaft 15, and a second translation shaft 16. Furthermore, the camera module illustrated in FIGS. 3 to 6 also includes a protective housing 34 for arranging various parts of the camera module and sealing the corresponding assembling clearance of the camera module. A driving component 13 of the camera module illustrated in FIGS. 3 to 6 includes a lead screw 21, an electric motor 22 connected with the lead screw 21, a movement conversion component 23, and a reducer 33. The reducer 33 is connected with the electric motor 22 and the lead screw 21 to reduce a rotational speed output by the electric motor 22 and drive the lead screw 21 to rotate. The movement conversion component 23 includes a spring magnetic component 31 and a spring magnetic component 32 which are symmetrical and screwed on the lead screw 21. The spring magnetic component 31 is correspondingly connected with the first translation shaft 15, and the spring magnetic component 32 is correspondingly connected with the second translation shaft 16. The spring magnetic component 31 and the spring magnetic component 32 synchronously and linearly move in opposite directions under the rotational movement of lead screw 21 to drive the first translation shaft 15 and the second translation shaft 16 to move in opposite directions. The protective housing 34 includes a sliding slot 35 and a sliding slot 36. The spring magnetic component 31 is arranged in the sliding slot 35, and the spring magnetic component 32 is arranged in the sliding slot 36. The spring magnetic component 31 and the spring magnetic component 32 which are screwed on the lead screw 21 cooperate with the sliding slot 35 and the sliding slot 36 respectively to convert the rotational movement of the lead rod 21 into linear reciprocating movement, thereby further controlling rotations of the first camera and the second camera.

The spring magnetic component 31 includes a sliding piece 311, a screw-guide piece 313 with a screw structure 312, and a reset spring 314. The sliding piece 311 is connected with the first translation shaft 15 corresponding to the spring magnetic component 31. The screw-guide piece 313 is screwed on the lead screw 21 by the screw structure 312. The sliding piece 311 is slidably connected to the screw-guide piece 313 by the reset spring 314.

The spring magnetic component 32 includes a sliding piece 321, a screw-guide piece 323 with a screw structure 322, and a reset spring 324. The sliding piece 321 is connected with the second translation shaft 16 corresponding to the spring magnetic component 32. The screw-guide piece 323 is screwed on the lead screw 21 by the screw structure 322. The sliding piece 321 is slidably connected to the screw-guide piece 323 by the reset spring 324.

In an embodiment, the screw-guide piece in the above embodiments is provided with a first magnet. The sliding piece is provided with a second magnet at a position opposite the first magnet, and magnetisms of the first magnet and the second magnet are opposite. The screw-guide piece and the sliding piece are in contact connection with each other under magnetic attraction forces of the first magnet and the second magnet.

In an embodiment, the sliding piece in the above-mentioned embodiment has a guide slot. A movement conversion component includes at least one guide column fixedly connected with the screw-guide piece after passing through the guide slot, so as to limit the displacement direction and displacement amplitude between the sliding piece and the screw-guide piece by cooperating with the guide slot. Optionally, the guide column may be a screw.

Figure 7:
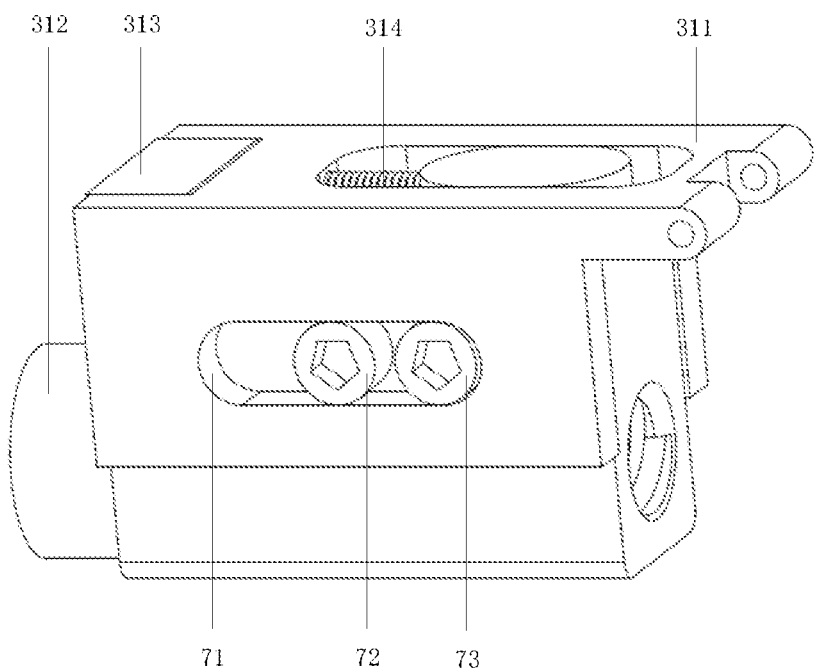
FIG. 7 is a side view of a sliding piece 311 and a screw-guide piece 313 of a spring magnetic component 31 which are connected with each other according to some embodiments.
Figure 8:
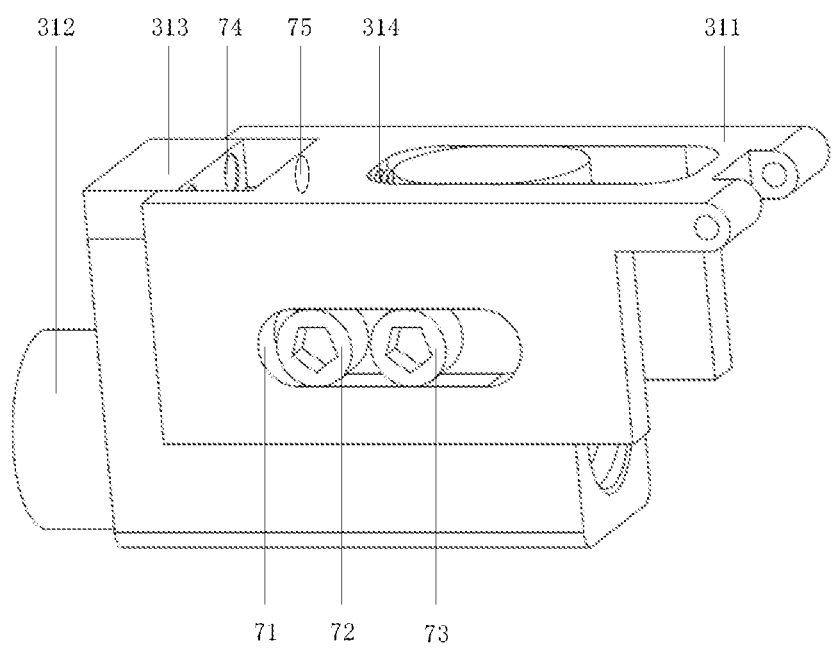
FIG. 8 is a side view of a sliding piece 311 and a screw-guide piece 313 of a spring magnetic component 31 which separate from each other according to some embodiments.

FIG. 7 is a side view of the sliding piece 311 and the screw-guide piece 313 of the spring magnetic component 31 which are connected with each other according to some embodiments. FIG. 8 is a side view of the sliding piece 311 and the screw-guide piece 313 of the spring magnetic component 31 which separate from each other according to some embodiments. On the basis of the above embodiments, as illustrated in FIGS. 7 and 8, the sliding piece 311 of the spring magnetic component 31 defines a guide slot 71. The movement conversion component 23 also includes a guide column 72 and a guide column 73 which are fixedly connected with the screw-guide piece 313 after passing through the guide slot 71 so as to limit the displacement direction and displacement amplitude between the sliding piece 311 and the screw-guide piece 313 by cooperating with the guide slot 71. The screw-guide piece 313 is provided with a first magnet 74, and the sliding piece 311 is provided with a second magnet 75 at a position opposite the first magnet 74. Magnetisms of the first magnet 74 and the second magnet 75 are opposite. The screw-guide piece 313 and the sliding piece 311 are in contact connection with each other under magnetic attraction forces of the first magnet 74 and the second magnet 75.

As illustrated in FIG. 7, when the camera module is not impacted by an external force, the sliding piece 311 is tightly connected with the screw-guide piece 313 by means of the magnetic forces of the first magnet 74 and the second magnet 75 and an elastic force of the reset spring 314. As illustrated in FIG. 8, when the camera module is impacted by the external force, the sliding piece 311 and the screw-guide piece 313 are forced to separate, such that impact force cannot be transferred directly to the lead screw, which damages the lead screw and other components otherwise. When the external force disappears, the reset spring 314 pushes the sliding piece 311 to the screw-guide piece 313 again, such that the sliding piece 311 is tightly connected with the screw-guide piece 313.

Figure 9:
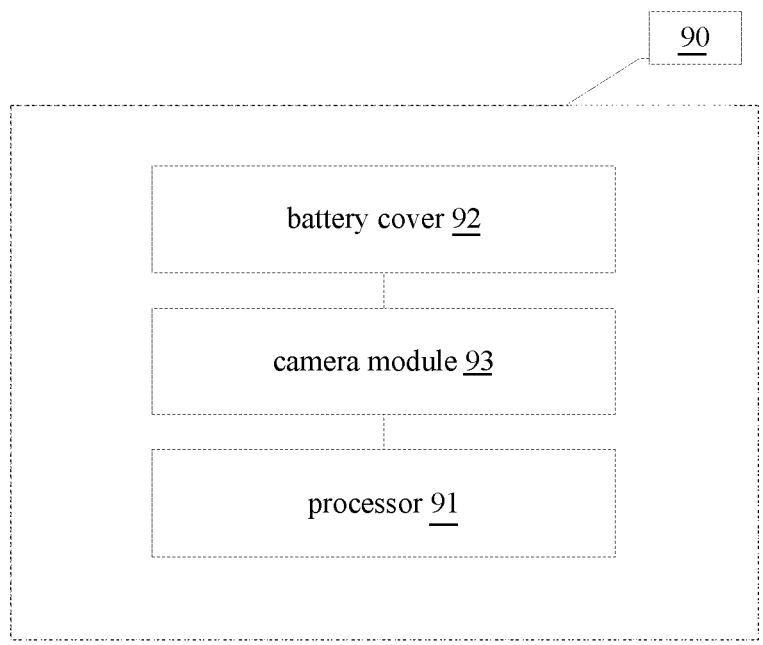
FIG. 9 is a block diagram of a terminal according to some embodiments.
Figure 10:
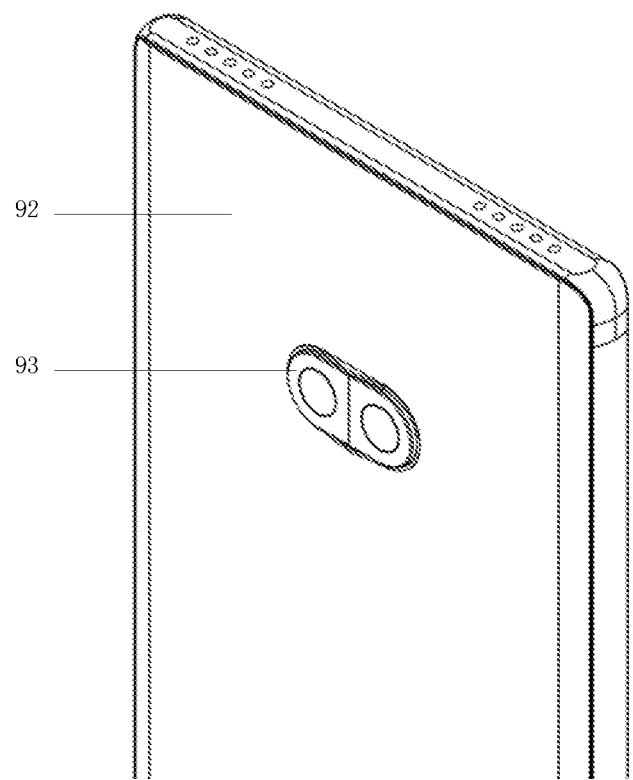
FIG. 10 is a side view of a terminal according to some embodiments before expansion of a viewing angle of a camera module.
Figure 11:
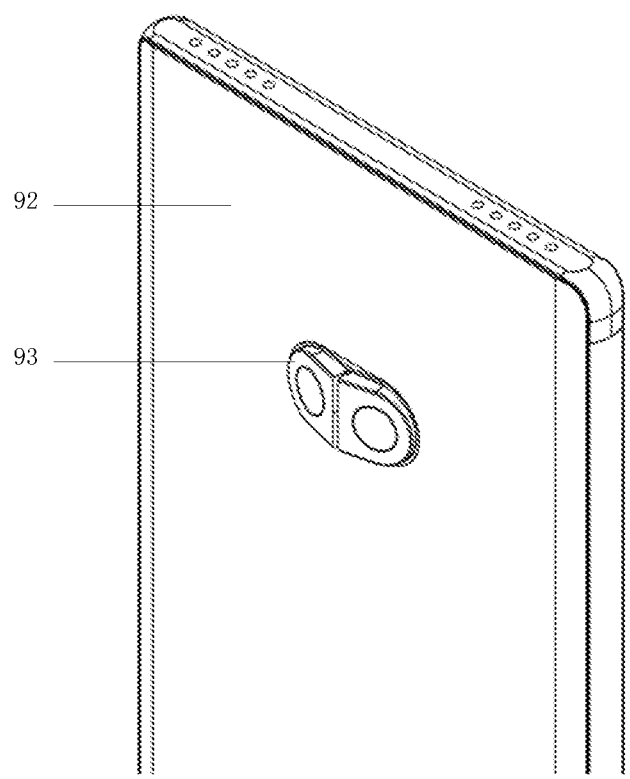
FIG. 11 is a side view of a terminal according to some embodiments after expansion of a viewing angle of a camera module.
Figure 12:
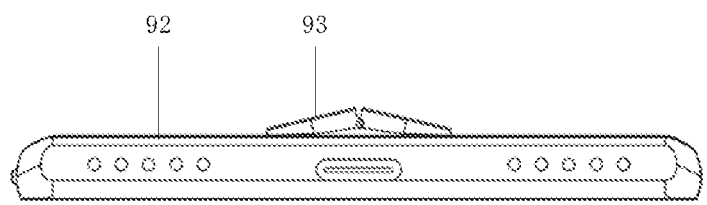
FIG. 12 is a bottom view of a terminal according to some embodiments after expansion of a viewing angle of a camera module.

FIG. 9 is a block diagram of a terminal according to some embodiments. FIG. 10 is a side view of a terminal according to some embodiments before expansion of a viewing angle of a camera module. FIG. 11 is a side view of a terminal according to some embodiments after expansion of a viewing angle of a camera module. FIG. 12 is a bottom view of a terminal according to some embodiments after expansion of a viewing angle of a camera module. As illustrated in FIGS. 9 to 12, a terminal 90 includes a processor 90, a battery cover 92, and a camera module 93. The camera module may be the camera module provided in any one of the above embodiments.

The processor 91 is connected with the camera module 93 and configured to instruct the driving component of the camera module 93 to drive the first camera and the second camera to rotate synchronously about the shaft of the camera module 93 in two opposite directions, to instruct the first camera and the second camera to photograph at least two non-wide-angle images in different ranges of viewing angles during rotations, and to synthesize the non-wide-angle images into a wide-angle image.

Exemplarily, the processor 91 may control the first camera and the second camera to photograph images for synthesis at positions relative to a surface of the battery cover at maximum rotational angles, or to photograph multi-frame images continuously for synthesis during the rotations of the first camera and the second camera, or to photograph multi-frame images in a specified direction for synthesis during the rotations of the first camera and the second camera, or to accomplish shooting a video during a single rotation process.

Exemplarily, by optimizing a height difference between the shaft and the first translation shaft as well as the second translation shaft, a clearance between the first camera as well as the second camera and the battery cover can be controlled during movement, such that the clearance is reduced first and then increased. Therefore, a small average clearance in the whole process is ensured, and foreign matters such as water vapor and dust intruding into the terminal are reduced, improving the sealing performance of the terminal. Furthermore, the camera module may be installed to a support component, such as a middle frame of the terminal, in an inside of the terminal by a screw or glue. Then after installing the terminal battery cover, with the cooperation between the protective housing on the camera module and the battery cover, a sealed chamber is defined, the foreign matters such as water vapor and dust can be prevented from intruding into the interior of the terminal.

Exemplarily, the battery cover defines a through hole for light collection of the first camera and the second camera of the camera module. Optionally, the first camera and the second camera of the camera module pass through the through hole and protrude on the surface of the battery cover. Optionally, the terminal may be provided with a transparent cover to cover the camera module and prevent foreign matters such as water vapor and dust from intruding into the terminal.

It should be noted that, the first camera and the second camera of the camera module of the terminal illustrated in FIGS. 9 to 12 are arranged horizontally, but it is not limited in the present disclosure. In practice, the two cameras of the terminal camera module may also be arranged vertically, etc. However, the arrangement of the two cameras of the camera module determines an expanding direction of the viewing angle of the camera module.

According to the technical scheme provided by embodiments of the present disclosure, the range of the viewing angle of each of the cameras is changed by driving the two cameras to rotate synchronously, thereby expanding the range of the effective viewing angle of the camera module. The camera module can automatically photograph high-quality and wide-angle images without a wide-angle lens, and the image quality is improved. The camera module meets users' photographing needs and improves users' experience.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A camera module, comprising:
   a first camera provided with a first translation shaft;
   a second camera provided with a second translation shaft, wherein the second camera is coupled with the first camera by a shaft, the first camera and the second camera being symmetrical about the shaft and each configured to photograph a non-wide-angle image; and
   a driving component coupled with the first translation shaft and the second translation shaft and configured to drive the first translation shaft and the second translation shaft to move in opposite directions and drive the first camera and the second camera to rotate synchronously in two opposite directions about the shaft.

2. The camera module according to claim 1, wherein:
   the driving component comprises:
     a lead screw; an electric motor coupled with the lead screw; and
     a movement conversion component;
   the electric motor is configured to drive the lead screw to rotate;
   the movement conversion component is screwed on the lead screw and coupled with the first translation shaft and the second translation shaft; and
   the movement conversion component is configured to convert a rotational movement of the lead screw into a linear movement, to drive the first translation shaft and the second translation shaft to move in opposite directions.

3. The camera module according to claim 2, wherein:
   the movement conversion component comprises two symmetrical spring magnetic components;
   the two spring magnetic components are screwed on the lead screw and correspondingly connected with the first translation shaft and the second translation shaft;
   the two spring magnetic components synchronously and linearly move in opposite directions under the rotational movement of lead screw, to drive the first translation shaft and the second translation shaft to move in opposite directions; and each of the spring magnetic components comprises a sliding piece, a screw-guide piece with a screw sleeve, and a reset spring, the sliding piece is connected with the translation shaft corresponding to each of the spring magnetic components, the screw-guide piece is screwed on the lead screw by the screw sleeve; the sliding piece is slidably connected to the screw-guide piece by the reset spring.

4. The camera module according to claim 3, wherein:

the screw-guide piece is provided with a first magnet, the sliding piece is provided with a second magnet at a position opposite the first magnet, magnetisms of the first magnet and the second magnet are opposite;

the screw-guide piece and the sliding piece are in contact connection with each other under magnetic attraction forces of the first magnet and the second magnet.

5. The camera module according to claim 3, wherein:

the sliding piece defines a guide slot;

the movement conversion component further comprises:

at least one guide column fixedly connected with the screw-guide piece after passing through the guide slot, to limit a displacement direction and displacement amplitude between the sliding piece and the screw-guide piece by cooperating with the guide slot.

6. The camera module according to claim 2, wherein the driving component further comprises a reducer connected with the electric motor and the lead screw to reduce a rotational speed output by the electric motor and drive the lead screw to rotate.

7. The camera module according to claim 2, wherein the electric motor is one of a rotor motor or a linear motor.

8. The camera module according to claim 1, further comprising a protective housing to arrange parts of the camera module and seal a corresponding assembling clearance of the camera module.

9. A camera module, comprising:

a first camera provided with a first translation shaft;

a second camera provided with a second translation shaft and coupled with the first camera by a shaft, the first camera and the second camera being symmetrical about the shaft and each configured to photograph a non-wide-angle image; and a driving component coupled with the first translation shaft and the second translation shaft to drive the first camera and the second camera to move towards each other or away from each other and drive the first camera and the second camera to rotate synchronously about the shaft towards each other or away from each other.

10. The camera module according to claim 9, wherein the driving component comprises a lead screw, an electric motor connected with the lead screw to drive the lead screw to rotate, and a movement conversion component screwed on the lead screw, connected with the first translation shaft and the second translation shaft, and configured to convert a rotational movement of the lead screw into a linear movement, to drive the first translation shaft and the second translation shaft to move towards each other or away from each other.

11. The camera module according to claim 10, wherein the movement conversion component comprises two spring magnetic components screwed on the lead screw and correspondingly connected with the first translation shaft and the second translation shaft, the two spring magnetic components synchronously and linearly move towards each other or away from each other under the rotational movement of the lead screw; each of the spring magnetic components comprises a sliding piece, a screw-guide piece with a screw sleeve, and a reset spring, the sliding piece is connected with the translation shaft corresponding to each of the spring magnetic components, the screw-guide piece is screwed on the lead screw by the screw sleeve, the sliding piece is slidably connected to the screw-guide piece by the reset spring.

12. The camera module according to claim 11, wherein the screw-guide piece is provided with a first magnet, the sliding piece is provided with a second magnet opposite the first magnet, the screw-guide piece and the sliding piece are in contact connection with each other under magnetic attraction forces of the first magnet and the second magnet.

13. The camera module according to claim 11, wherein the sliding piece defines a guide slot; the movement conversion component further comprises at least one guide column fixedly connected with the screw-guide piece after passing through the guide slot.

14. The camera module according to claim 11, wherein the camera module further comprises a protective housing, the protective housing defining two sliding slots to receive the two spring magnetic components respectively.

15. The camera module according to claim 9, wherein the driving component further comprises a reducer connected with the electric motor and the lead screw to reduce a rotational speed output by the electric motor and drive the lead screw to rotate.

16. The camera module according to claim 9, wherein the electric motor is one of a rotor motor or a linear motor.

17. A terminal, comprising: a processor, a battery cover, and a camera module, wherein the camera module comprises:

a first camera;

a second camera coupled with the first camera by a shaft, the first camera and the second camera being symmetrical about the shaft and each configured to photograph a non-wide-angle image; and a driving component coupled with the first camera and the second camera to drive the first camera and the second camera to rotate about the shaft and obliquely protrude from the battery cover; and the processor is coupled with the camera module and configured to instruct the driving component of the camera module to drive the first camera and the second camera to rotate synchronously about the shaft in two opposite directions, and to instruct the first camera and the second camera to photograph at least two non-wide-angle images in different ranges of viewing angles during rotation, and to synthesize the non-wide-angle images into a wide-angle image, wherein the first camera is provided with a first translation shaft the second camera is provided with a second translation shaft, the driving component is coupled with the first translation shaft and the second translation shaft to drive the first translation shaft and the second translation shaft to move in opposite directions and drive the first camera and the second camera to rotate synchronously in two opposite directions about the shaft.

18. The terminal according to claim 17, wherein the driving component comprises a lead screw, an electric motor coupled with the lead screw to drive the lead screw to rotate, and a movement conversion component screwed on the lead screw, connected with the first translation shaft and the second translation shaft, and configured to convert a rotational movement of the lead screw into a linear movement, to drive the first translation shaft and the second translation shaft to move towards each other or away from each other.

19. The terminal according to claim 17, wherein the processor is configured to:
  instruct the first camera and the second camera to photograph multi-frame images continuously during rotation, or photograph multi-frame images in a specified direction during rotation; and
  synthesize the non-wide-angle images into a wide-angle image.

* * * * *